United States Patent [19]

Breault et al.

[11] 4,075,365

[45] Feb. 21, 1978

[54] TURQUOISE-PLASTIC-COMPOSITE

[75] Inventors: Homer Breault; Alvin E. Witt, both of Pine Glen, Pa.

[73] Assignee: Atlantic Richfield Company, Los Angeles, Calif.

[21] Appl. No.: 648,842

[22] Filed: Jan. 14, 1976

[51] Int. Cl.$^2$ .................... B05D 3/06; A44C 17/00
[52] U.S. Cl. .................................. 427/36; 427/44; 427/242; 427/385 R; 63/32; 63/DIG. 3
[58] Field of Search ............... 427/385 R, 385 C, 44, 427/221, 242, 36; 428/15, 404, 407, 540; 63/32, DIG. 3

[56] References Cited

U.S. PATENT DOCUMENTS 3,935,364   1/1976   Proksch et al. .................... 427/44 X Primary Examiner—Ronald H. Smith
Assistant Examiner—Evan K. Lawrence
Attorney, Agent, or Firm—John R. Ewbank

[57] ABSTRACT

A turquoise is impregnated with a monomeric diester having two spaced apart polymerizable monoolefinic groups, said diester having a plurality of supplemental hydrophillic groups and a volatility corresponding to a boiling point within a range from about 150° C to about 300° C. Whatever moisture may be sorbed on the turquoise is encapsulated within the plastic during the in-situ polymerization, inasmuch as such sorbed moisture can associate with such supplemental hydrophillic groups having an affinity for water. The dimethacrylate ester of triethylene glycol has two supplemental ether groups which tend to have affinity for water. Thus the monomer is sorbed on surfaces displacing any sorbed moisture in the internal pores or fissures in the turquoise, whereby the impregnation of the turquoise is feasible without critical control of vacuum drying and/or related preparatory steps. Thus one overcomes prior difficulties connected with drying the turquoise, evacuating the turquoise, preconditioning the turquoise in a warm water bath and the multi-stage treatment for polymerization. The diester thus impregnated into the turquoise can be adequately polymerized to a weather resistant composite by catalytic, thermal, or radiation initiation of the polymerization. The heat of polymerization is so small that gems are not impaired thereby.

8 Claims, No Drawings

TURQUOISE-PLASTIC-COMPOSITE

FIELD OF INVENTION

This invention relates to the upgrading of gems such as turquoise by formation of plastic in the fissures and pores of a composite.

PRIOR ART

A turquoise is a gem having a shade which can vary from robin's egg blue to a dark blue and may have a significant greenish tint. The composition of turquoise is variable and can be thought of as a complex hydrated silicate. Compositions lacking the desirable characteristics of gem grade but having a somewhat similar composition are sometimes called chalk turquoise. Heretofore, there have been methods whereby a turquoise-plastic-composite has been prepared by polymerizing after appropriate impregnation of the chalk turquoise with monomeric styrene.

Such prior art process included the steps of drying the chalk turquoise, subjecting the thoroughly dried chalk turquoise to a very low vacuum to further dry and degas the porous chalk turquoise, allowing liquid styrene to flow into the evacuated chamber containing the evacuated degassed chalk turquoise, thereby vacuum impregnating the chalk turquoise with the monomeric styrene, removing the stone from the liquid styrene and preconditioning it in a warm water bath to partially polymerize the styrene further polymerizing the styrene in a hot water bath, separating each of the stones to prevent any adhesion of stones, wrapping each stone in aluminum foil, and heating the aluminum foil covered precursor in an oven to complete polymerization.

In the oven there is often a significant amount of volatilization of the organic component so that the turquoise-plastic-composite does not contain as much solidified plastic as desired. The process is also disadvantageous because of the spotty appearance of the composite attributable to the uneven wetting of the stones by the monomer during the impregnation step. Such prior art process has been of interest because the color and appearance of the turquoise-plastic-composite is sufficiently close to that of top grade gem turquoise to permit the use of the composites in jewelry.

Such prior art process has required a significant amount of specialized apparatus even for small scale operation. There has been a continuing demand for a process of making attractive weatherable turquoise-plastic-composite by a simpler process.

SUMMARY OF THE INVENTION

In accordance with the present invention, a turquoise-plastic-composite is prepared by impregnating a turquoise with a liquid monomer having a plurality of hydrophillic groups so that the monomer tends to be sorbed along the same interstices of the turquoise in which any water is sorbed. Because of this propensity of the monomer to be sorbed into the same zones wherein water is sorbed, the impregnation can proceed more readily than the impregnation of the hydrophobic type of monomer such as styrene. The monomer must have a volatility corresponding to that of a liquid having a boiling point within a range from about 150° C to about 300° C. Its vapor pressure at room temperature must be low enough to avoid significant loss of the monomer by volatilization and the polymerization should not volatilize monomer. The monomer is a diester having two monofunctional unsaturated groups esterified to a difunctional molecule. If the unsaturated compound is an alcohol such as allyl alcohol or crotanyl alcohol, then the difunctional component is a difunctional carboxylic acid having a plurality of hydrophillic groups in the molecule. Gluconoc acid, a tetrahydroxy dicarboxylic adipic acid, and tartaric acid are examples of difunctional acids having water affinity groups, sometimes called hydrophillic groups. The diether formed by symmetrical addition of 2 mols of gylcolic acid to acetylene to form the ethylene glycol diether of gylcolic acid also has a plurality of water affinity groups as a difunctional acid.

DESCRIPTION OF EMBODIMENTS

The nature of the invention if further clarified by reference to a plurality of examples.

EXAMPLE 1

An assortment of about 500 pounds of chalk turquoise stones varying in size from about the size of rice grains to the size of goose eggs are deposited as an approximately single layer partially covering the bottom of a porous woven wire basket. The stones are subjected to a series of cleaning steps to remove the dirt therefrom. The cleaned stones are dried. The dried stone in such porous basket is transferred to an impregnation chamber and there immersed in a liquid monomer consisting essentially of the dimethracrylate diester of triethylene ether glycol. Such impregnation is continued for an interval of about 50 minutes during most of which a nitrogen pressure of about 7 atmospheres is maintained for urging the monomer into the pores.

The thus impregnated stones contain from about 10% to about 30% diester. Such impregnated stones are transferred to a tumbling drum type of sealed canister in a polymerization apparatus featuring the use of a cobalt-60 source of gamma radiation. The canister is directed from the loading zone above the water surface through a predetermined path which includes a lowering of the canister into a submerged radiation zone. Each canister is advanced along a path in which the series of canisters are successively in close proximity to a plurality of tubes containing cobalt-60 isotope, thereby being subjected to gamma radiation.

Factory personnel are protected from the gamma radiation by reason of the pool of water and the positioning of the tubes of cobalt-60 at a safe depth beneath the water. A depth of from about 20 to about 40 feet, such as 26 feet, is suitable for a radiation panel.

The advancing conveyor system moves at a speed such that the radiation dosage for the canister passing through the polymerization zone is about 250,000 rads per hour, which is deemed appropriate for achieving the desired degree of polymerization in the stones tumbling in the rotating canister. Thus the canister is subjected to such cobalt-60 radiation during an interval which desirably is 1.5 hours but which can be within the range from about 0.25 to 4 hours.

The in-situ polymerization of the dimethracrylate of triethylene ether glycol generates heat, thereby raising the temperature of the turquoise rocks in which the solid polymethacrylate is formed. The moisture content of the turquoise is encapsulated within such solid polymethacrylate so that the turquoise-plastic-composite is stabilized throughout all of the variations in humidity which weather can provide.

The water in the pool has a propensity toward promoting generally isothermal conditions in the polymerization zone. Some of the heat generated by polymerization is eventually transferred from the rocks to the canister to the water in the pool. The heat transfer rates to the water are slow enough that the turquoise rocks are noticeably warmed by the polymerization step. The increase in temperature of the turquoise in the polymerization is not sufficient to be harmful to the turquoise.

The rotating sealed tumbling drum type of canister advances along the conveyor system and eventually advances to the top of the pool and to above the surface of the pool to a discharge zone so that the canister can be removed from the conveyor system. The warm turquoise rocks are removed from the canister and are inspected for quality control.

The dimethracrylate of triethylene ether glycol undergoes shrinkage during polymerization. The solid tends to shrink into the pores of the turquoise with minimized propensity toward laking or exuding from the surface of the composite. The polymerization process generates heat which tends to stimulate molecules to migrate. Accordingly, when the polymerization is induced by reason of heat, the front zone of polymerization tends to advance as the heat transfer advances. An important advantage of the use of radiation for inducing polymerization for in-situ polymerized composites is the greater uniformity of the penetration of the radiation toward the center of the composite. However, the in-situ polymerization of impregnated turquoise stones in a sealed tumbling drum having a nitrogen atmosphere can yield useful products when the diesters of the present invention are thermally and/or catalytically polymerized. Radiation polymerization is preferred because the quality of the product gems is superior when radiation polymerization is utilized.

EXAMPLE 2

A series of stainless steel tubes each about 1 meter long are filled with granular cobalt having an enriched concentration of cobalt-60. The tubes were sealed and were assembled as a panel having dimensions of about 1 by 2 meters. The panel was positioned at the bottom of a pool of water, the pool having a depth of about 8 meters and dimensions of about 15 by 7 meters.

A reversible conveyor system was adapted to shift containers scheduled for radiation from a loading/unloading zone down to the submerged zone immediately above the radiation panel for a controlled interval and thereafter returned to the loading/unloading zone. The conveyor system permits remote control of the container while in the radiation zone while still protecting personnel from the effects of the radiation from the cobalt-60 panel.

A tumbling drum having a diameter of about 36 centimeters is provided with means for maintaining a sealed nitrogen atmosphere and for slowly rotating a charge of about 20 kg of granular material for the preparation of composites of a generally granular size, whereby the propensities toward adhesion between particles is decreased during the polymerization step. Granular size is deemed to extend from about the size of a grain of rice to the size of an orange, but in the processing of the turquoise composites the upper size limit is generally not more than about the size of a goose egg.

A batch of about 20 kg. of chalk turquoise stones having a size from about the size of a pea to the size of a silver dollar and averaging about the size of a 25¢ coin is washed to remove dirt and contaminants and thereafter rinsed and dried. The dried stones are transferred to a pressurized impregnating chamber in which nitrogen pressure at about 7 atmospheres helps to force the dimethracrylate of tetrapropylene ether glycol into the pores of the chalk turquoise stones.

The thus impregnated stones are transferred to the tumbling drum, which is rotated to prevent the stones from adhering to each other during the polymerization in the radiation zone. By reason of the rotation, each stone receives approximately the same amount of radiation from the submerged panel. The diester is polymerized to a weather resistant solid more readily than a monomer such as methyl methracrylate. Moreover, the heat of polymerization is somewhat less by reason of the fact that tetrapropylene ether glycol has a molecular weight more than twice that of methyl alcohol.

The precursor particles contained diester amounting to from about 10% to about 30% of the initial weight of the turquoise stones. Thus the amount of impregnate is significantly less than is customary in connection with the preparation of wood composites following the procedures prescribed in Bell U.S. Pat. No. 3,808,030 employing a similar radiation panel and similar pool of water.

The duration of the radiation treatment can be from about 0.5 to about 4 hours and is desirably about 2 hours. Thus the amount of radiation necessary for preparing a turquoise-plastic-composite is less and the duration is shorter than described for the preparation of high quality wood-plastic composites.

After the tumbling turquoise stones have been radiated with about 250,000 rads per hour for about 2 hours, they are withdrawn from the radiation zone and lifted above the surface of the pool to the transfer zone and unloaded from the tumbling drum. Although the chalk turquoise stones are nearly white, the plastic composites have an attractive blue green appearance making them suitable for use as turquoise gems. Moreover, the turquoise impregnated with plastic is weatherproof and can withstand all types of conditions to which a turquoise might ordinarily be encountered without damage to the advantageous gem properties of the composite.

EXAMPLE 3

A batch of turquoise-plastic-composites is prepared following the general procedure of Example 2 and using as the impregnating solution a commercial grade of the dimethracrylate ester of triethylene ether glycol containing about 35 parts per million of BHT inhibitor. The BHT inhibitor is sometimes called butylate hydroxide toluene. The presence of the inhibitor in the monomer permits the liquid to have a greater shelf life than would otherwise be feasible. However, the conditions involving the chain reaction of free radicals for the polymerization in the zone influenced by the cobalt-60 panel promotes the polymerization of the diester at a rate which does not scorch the plastic product. The radiation rate of 250,000 rads per hour is maintained for about 2 hours. The heat dissipation rates are adequate so that the final temperature of the tumbled product having the solidified polymethracrylate is low enough that the impregnated polymerized composites can be handled without discomfort.

EXAMPLES 4-9

Attractively colored turquoise gems are prepared following the general procedure of Example 3 but employing liquid diesters containing inhibitors in amounts of the general magnitude from about 20 to about 60 parts per million and polymerizing the composites during a radiation of from about 0.5 to about 4 hours using cobalt-60 radiation providing from about 50,000 to about 500,000 rads per hour. Data relating to the diester and polymerization conditions are shown in the accompanying Table 1.

quality gems. The diester does polymerize far more satisfactorily than a methyl methracylate or a styrene so that the attractiveness of the thermal catalytic polymerization might be dependent upon establishing any market for the substandard gems instead of dealing with them as a waste product involving waste disposal costs.

It can be noted that the diesters of Examples 1, 2, 3, 5 and 6 correspond to the formula:

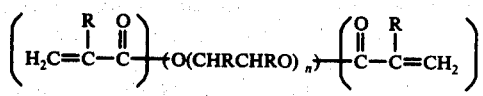

Table 1

| Example | diester | formula |
|---------|---------|---------|
| 1 | triethylene glycol dimethacrylate | H₂C=C(CH₃)—CO₂CH₂CH₂OCH₂CH₂OCH₂CH₂O₂C—C(CH₃)=CH₂ |
| 2 | tetrapropylene glycol dimethacrylate | H₂C=C(CH₃)—CO₂CH₂CH(CH₃)—[OCH₂CH(CH₃)]₂—OC(CH₃)H—CH₂O₂C—C(CH₃)=CH₂ |
| 3 | triethylene glycol dimethacrylate | H₂C=C(CH₃)—CO₂CH₂CH₂O—CH₂CH₂O—CH₂CH₂O₂C—C(CH₃)=CH₂ |
| 4 | diallyl gluconate | H₂C=CH—CH₂O₂C—(CHOH)₄CO₂CH₂CH=CH₂ |
| 5 | tetraethylene glycol dimethacrylate | H₂C=C(CH₃)—CO₂CH₂CH₂(OCH₂CH₂)₃O₂CC(CH₃)=CH₂ |
| 6 | tripropylene glycol diacrylate | H₂C=CH—CO₂CH₂C(H)(CH₃)(OCH₂C(H)(CH₃))₂O₂CCH=CH₂ |
| 7 | diallyl tartrate | H₂C=CHCH₂O₂C (CHOH)₂CO₂CH₂CH=CH₂ |
| 8 | dicrotonyl trihydroxy glutarate | H₂C=CHCH₂CH₂O₂C (CHOH)₃CO₂CH₂CH₂CH=CH₂ |
| 9 | diallyl diglycolate of ethylene ether | H₂C=CHCH₂O₂C—CH₂OCH₂CH₂OCH₂CO₂CH₂CH=CH₂ |

| Example | concn. inh. ppm | rad/hour | hours |
|---------|------|----------|-------|
| 1 |    | 250,000 | 1.5 |
| 2 |    | 250,000 | 2 |
| 3 | 35 | 250,000 | 2 |
| 4 | 20 | 300,000 | 2 |
| 5 | 60 | 500,000 | 0.25 |
| 6 | 40 | 50,000 | 4 |
| 7 | 20 | 350,000 | 1.5 |
| 8 | 50 | 400,000 | 3 |
| 9 | 45 | 200,000 | 0.5 |

EXAMPLE 10

A batch of chalk turquoise stones are cleaned, washed, dried, and impregnated at 7 atmospheres with the liquid dimethacrylate of triethylene ether glycol. In addition to the 35 ppm of BHT, the diester contained 0.5% of 70% tertiary butyl hydroperoxide which is mixed with the diester just prior to impregnation. At room temperature such tertiary butyl hydroperoxide in such concentration is substantially inert. When impregnated turquoise stones are heated in the tumbling drum to a temperature of about 100° C, the tertiary butyl hydroperoxide is a very effective catalyst promoting rapid polymerization of the composite. The tumbling drum is desirably rotated in a hot water bath for about 2 hours to achieve the desired degree of polymerization when the thermal catalytic approach is employed instead of the radiation polymerization.

Gems are customarily subjected to visual inspection on an individual gem basis. Some of the turquoise-plastic-composites resulting from the catalytic thermal polymerization reaction are of substandard quality and cannot be marketed in competition with the superior in which each R is independently selected from hydrogen or a methyl group except that each alkoxy group has not more than one methyl group and in which n has a value of 3 or 4. It can also be noted that the diesters of Examples 4, 7 and 8 correspond to the formula

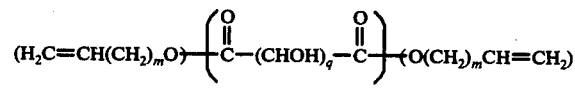

in which m is 1 or 2 and in which q is 2, 3 or 4. The diester of Example 9, corresponding to the formula:

as well as the two previously discussed generic formulas are all monomeric diesters formed by the esterification of two moles of a monoolefinic monomer and one mole of a difunctional reactant having a plurality of supplemental hydrophillic groups of the class consisting of hydroxy groups and ether groups, said diester having a volatility corresponding to a boiling point within the range from 150° C. to 300° C.

Various modifications are possible without departing from the scope of the appended claims.

The invention claimed is:

1. The method of enhancing the attractiveness of turquoise gems having impregnatable pores containing sorbed moisture which method consists essentially of the steps of:

impregnating a turquoise gem with a liquid monomeric diester formed by the esterification of two moles of a monoolefinic monomer and one mole of a difunctional reactant, said difunctional reactant having a plurality of supplemental hydrophillic groups of the class consisting of hydroxy groups and ether groups, said diester having a volatility corresponding to a boiling point within the range from about 150° C. to 300° C., said diester corresponding to either the formula:

in which each R is independently selected from hydrogen or a methyl group, except that each alkoxy group has not more than one methyl group, and in which n has a value of 3 or 4,
or the formula:

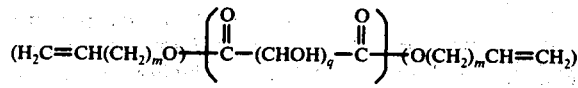

in which m is 1 or 2, and in which q is 2, 3 or 4;

polymerizing the monomeric diester thus impregnated into the turquoise gem to provide a solid plastic turquoise composite, at least some of the moisture sorbed in said turquoise gem being encapsulated within the plastic by reason of the presence of said plurality of hydrophillic groups in said difunctional reactant.

2. The method of claim 1 in which the monomeric diester is the dimethacrylate ester of triethylene glycol.

3. The method of claim 1 in which the monomeric diester is diallyl gluconate.

4. The method of claim 1 in which the monomeric diester is the dimethacrylate ester of tetraethylene glycol.

5. The method of claim 1 in which the monomeric diester is the diacrylate ester of tripropylene glycol.

6. The method of claim 1 in which the monomeric diester is diallyl tartrate.

7. The method of claim 1 in which the impregnated turquoise gems are tumbled in a rotating drum during polymerization, whereby propensities for gems to adhere to each other are decreased.

8. The method of claim 7 in which radiation from cobalt 60 isotope promotes said polymerization, said radiation being at a rate of about 250,000 rads per hour.